(12) United States Patent
Ono

(10) Patent No.: US 11,765,223 B2
(45) Date of Patent: Sep. 19, 2023

(54) INFORMATION PROCESSING SYSTEM

(71) Applicant: KABUSHIKI KAISHA TOSHIBA, Tokyo (JP)

(72) Inventor: Mizuki Ono, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 274 days.

(21) Appl. No.: 17/397,761

(22) Filed: Aug. 9, 2021

(65) Prior Publication Data

US 2022/0182438 A1    Jun. 9, 2022

(30) Foreign Application Priority Data

Dec. 4, 2020   (JP) ................................ 2020-201848

(51) Int. Cl.
*H04L 67/10* (2022.01)
*G06N 3/045* (2023.01)
(Continued)

(52) U.S. Cl.
CPC ............. *H04L 67/10* (2013.01); *G06N 3/045* (2023.01); *G08B 13/19656* (2013.01); *H04N 7/181* (2013.01)

(58) Field of Classification Search
CPC ....... H04L 67/10; H04L 67/565; G06N 3/045; G08B 13/19656; H04N 7/181
See application file for complete search history.

(56) References Cited

U.S. PATENT DOCUMENTS 9,277,165 B2 * 3/2016 Hiroike ............ G08B 13/19682
10,491,863 B2 * 11/2019 Yoneji ..................... G06T 7/292
(Continued)

FOREIGN PATENT DOCUMENTS

| JP | H7-128200 A | 5/1995 |
| JP | H11-3230 A | 1/1999 |
| JP | 2006-261949 A | 9/2006 |

OTHER PUBLICATIONS

S. Teerapittayanon et al., "BranchyNet: Fast Inference via Early Exiting from Deep Neural Networks," Proc. of the 23$^{rd}$ Int'l Conf. on Pattern Recognition, pp. 2464-2469 (2016).
(Continued)

*Primary Examiner* — El Hadji M Sall
(74) *Attorney, Agent, or Firm* — Finnegan, Henderson, Farabow, Garrett & Dunner, LLP

(57) ABSTRACT

An information processing system according to an embodiment includes at least one supplementary information processing apparatus and a main information processing apparatus. The main information processing apparatus is connected to each of the at least one supplementary information processing apparatus via a communication network. The supplementary information processing apparatus executes, on input information, arithmetic processing using a preceding network from an input layer to a boundary layer located at a predetermined position in a first neural network, and transmits intermediate information indicating an arithmetic result of the arithmetic processing using the preceding network, to the main information processing apparatus. The main information processing apparatus executes, on the intermediate information, arithmetic processing using a succeeding network from a layer subsequent to the boundary layer to an output layer in the first neural network.

10 Claims, 10 Drawing Sheets

(51) Int. Cl.
  *H04N 7/18*    (2006.01)
  *G08B 13/196*  (2006.01)

(56) References Cited

U.S. PATENT DOCUMENTS

| | | | | |
|---|---|---|---|---|
| 2005/0207487 A1* | 9/2005 | Monroe | ............... | H04N 7/181 |
| | | | | 348/E7.086 |
| 2017/0061644 A1* | 3/2017 | Pham | ................... | G06F 18/00 |
| 2017/0289504 A1* | 10/2017 | Fridental | ............... | H04N 7/181 |
| 2017/0351906 A1* | 12/2017 | Oguchi | ................. | H04N 7/18 |
| 2018/0247135 A1* | 8/2018 | Oami | .................. | H04N 7/181 |
| 2019/0027004 A1* | 1/2019 | Yang | .................. | G06F 18/256 |
| 2023/0052278 A1* | 2/2023 | Fukuda | ............... | H04N 5/2624 |

OTHER PUBLICATIONS

P. Panda et al., "Conditional Deep Learning for Energy-Efficient and Enhanced Pattern Recognition," Proc, of 2016 Design Automation and Test in Euro. Conf. and Exhibition, pp. 475-480 (2016).

K. He et al., "Deep Residual Learning for Image Recognition," Proc. of the IEEE Computer Soc. Conf. on Computer Vision and Pattern Recognition, pp. 770-778 (2016).

\* cited by examiner

FIG.3

IMAGE → 7x7 conv, 64, /2 → pool, /2 → 3x3 conv, 64 → 3x3 conv, 64 → 3x3 conv, 64 → 3x3 conv, 64 → 3x3 conv, 64 → 3x3 conv, 64 → 3x3 conv, 128, /2 → 3x3 conv, 128 → 3x3 conv, 128 → 3x3 conv, 128 → 3x3 conv, 128 → 3x3 conv, 128 → 3x3 conv, 128 → 3x3 conv, 128 → 3x3 conv, 256, /2 → 3x3 conv, 256 → 3x3 conv, 256 → 3x3 conv, 256 → 3x3 conv, 256 → 3x3 conv, 256 → 3x3 conv, 256 → 3x3 conv, 256 → 3x3 conv, 256 → 3x3 conv, 256 → 3x3 conv, 256 → 3x3 conv, 256 → 3x3 conv, 512, /2 → 3x3 conv, 512 → 3x3 conv, 512 → 3x3 conv, 512 → 3x3 conv, 512 → 3x3 conv, 512 → avg pool → fc 1000

PRECEDING NETWORK / FIRST NEURAL NETWORK / SUCCEEDING NETWORK

INFORMATION PROCESSING SYSTEM

CROSS-REFERENCE TO RELATED APPLICATIONS

This application is based upon and claims the benefit of priority from Japanese Patent Application No. 2020-201848, filed on Dec. 4, 2020; the entire contents of which are incorporated herein by reference.

FIELD

Embodiments described herein relate generally to an information processing system.

BACKGROUND

A surveillance system is known that, for example, uses a neural network to determine whether a person is present in an area under surveillance from image data captured by a surveillance camera. Such a surveillance system periodically transmits image data from an edge apparatus including a camera and a transmitter to a data center. The data center then executes arithmetic processing using the neural network on the image data received from the edge apparatus and determines whether a person is included in the image data.

Such a surveillance system also transmits image data in which no person is present to the data center. When the surveillance system includes a large number of edge apparatuses, such image data is transmitted to the data center in high volume. As such, such a surveillance system needs to take a measure of, for example, lengthening image data transmission intervals to prevent an increase in a communication load. Furthermore, the data center needs to execute the arithmetic processing using the neural network also on image data containing no target. Thus, in such a surveillance system, the load of the arithmetic processing at the data center is heavy.

BRIEF DESCRIPTION OF THE DRAWINGS

FIG. 3 is a diagram illustrating an example configuration of a first neural network;

DETAILED DESCRIPTION

An information processing system according to an embodiment includes at least one supplementary information processing apparatus and a main information processing apparatus. The main information processing apparatus is configured to be connected to each supplementary information processing apparatus via a communication network. Each supplementary information processing apparatus includes one or more hardware processors configured to function as an inputter, a first arithmetic processor, and a transmitter. The inputter is configured to acquire input information. The first arithmetic processor is configured to execute, on the input information, arithmetic processing using a preceding network, where the preceding network is a portion from an input layer to a boundary layer in a first neural network, and the boundary layer is located at a predetermined position. The transmitter is configured to transmit intermediate information to the main information processing apparatus, where the intermediate information indicates an arithmetic result of the arithmetic processing using the preceding network. The main information processing apparatus includes one or more hardware processors configured to function as a receiver, a second arithmetic processor, and an outputter. The receiver is configured to receive the intermediate information from each supplementary information processing apparatus. The second arithmetic processor is configured to execute, on the intermediate information, arithmetic processing using a succeeding network, where the succeeding network is a portion from a layer subsequent to the boundary layer to an output layer in the first neural network. The outputter is configured to output output information indicating an arithmetic result of the arithmetic processing using the succeeding network. An object of an embodiment herein is to provide an information processing system that can reduce a communication load and distribute an arithmetic load. An information processing system 10 according to an embodiment will be described below with reference to the drawings.

First Embodiment

Figure 1:
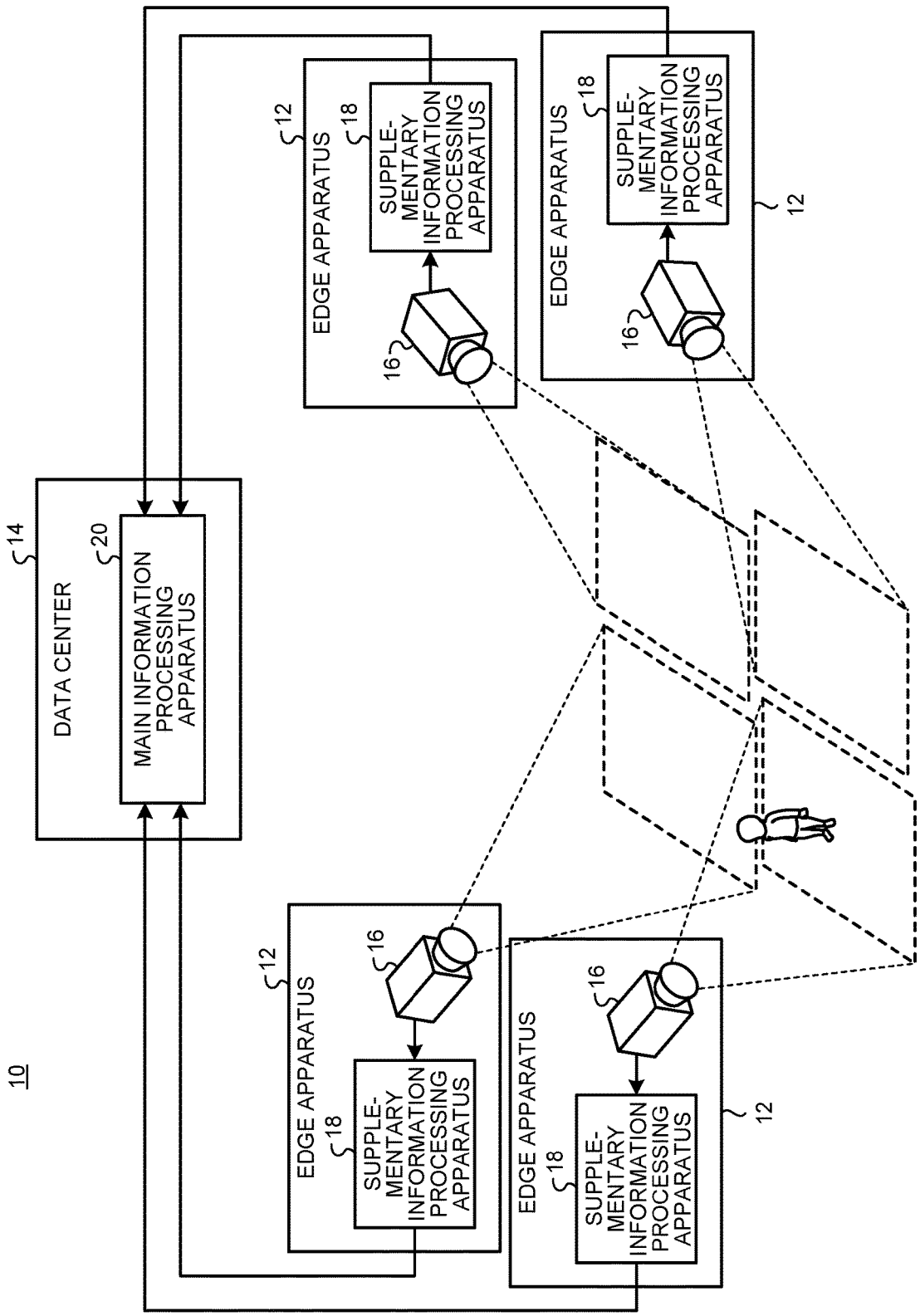
FIG. 1 is a diagram illustrating an information processing system.

FIG. 1 is a diagram illustrating the information processing system 10. The information processing system 10 according to a first embodiment is an edge computing system. In this embodiment, the information processing system 10 captures images of a wide area under surveillance with a plurality of image pickup cameras and monitors whether a suspicious person or the like is present in the area under surveillance.

The information processing system 10 includes at least one edge apparatus 12 and a data center 14. In this embodiment, the information processing system 10 includes a plurality of the edge apparatuses 12.

The edge apparatuses 12 are arranged in a distributed manner. The edge apparatuses 12 each include an information acquisition device and a supplementary information processing apparatus 18 being a computer. The information acquisition device acquires input information with a sensor or the like. In this embodiment, the edge apparatuses 12 each include a camera 16 as the information acquisition device. The camera 16 of each of the edge apparatuses 12 periodically captures an image of a portion of the area under surveillance. The camera 16 of each of the edge apparatuses 12 periodically supplies data on the captured image to the supplementary information processing apparatus 18.

The supplementary information processing apparatus 18 acquires the input information from the information acquisition device and executes predetermined information processing on the acquired input information. The supplementary information processing apparatus 18 then transmits information obtained by executing the predetermined information processing to the data center 14 via a communication network. In this embodiment, the supplementary information processing apparatus 18 of each of the edge apparatuses 12 periodically acquires the image data captured by the corresponding camera 16 as the input information and executes the predetermined information processing on the acquired image data. The supplementary information processing apparatus 18 then transmits information obtained by executing the predetermined information processing to the image data to the data center 14 via the communication network.

The data center 14 receives the information from each of the edge apparatuses 12 via the communication network. Each time the information is received from each of the edge apparatuses 12, the data center 14 executes predetermined information processing to the received information. In this embodiment, the data center 14 includes a main information processing apparatus 20. The main information processing apparatus 20 may be a single computer, a cloud that works through cooperation between a plurality of computers, or the like.

In this embodiment, the main information processing apparatus 20 receives the information obtained by executing the predetermined information processing on a plurality of pieces of the image data captured by the edge apparatuses 12. The main information processing apparatus 20 then executes the predetermined information processing on the information received from the edge apparatuses 12 to detect a suspicious person or the like present in the area under surveillance and outputs a detection result.

Note that the information processing system 10 may be applied to a system other than a system of monitoring whether a suspicious person or the like is present in an area under surveillance. For example, the information processing system 10 may be a system that observes the state of livestock in animal husbandry or a system that observes the state of crops in cultivation. Alternatively, the information processing system 10 may be applied to, for example, a system of monitoring the flow of people in a station, an underground mall, a shopping street, an event site, or the like, or a system of monitoring the state of traffic congestion or the state of a traffic jam on a road. Furthermore, the information processing system 10 is not limited to a system that processes image data captured by the camera 16 and may be a system that processes sound data. For example, the information processing system 10 may be applied to a system of detecting an abnormal sound in a factory or the like, or a system of detecting noise on a major road, a railroad, or in its vicinity or the like. Alternatively, the information processing system 10 may be applied to a weather observation system of processing observation data indicating atmospheric pressure, temperature, wind velocity, wind direction, or the like.

Figure 2:
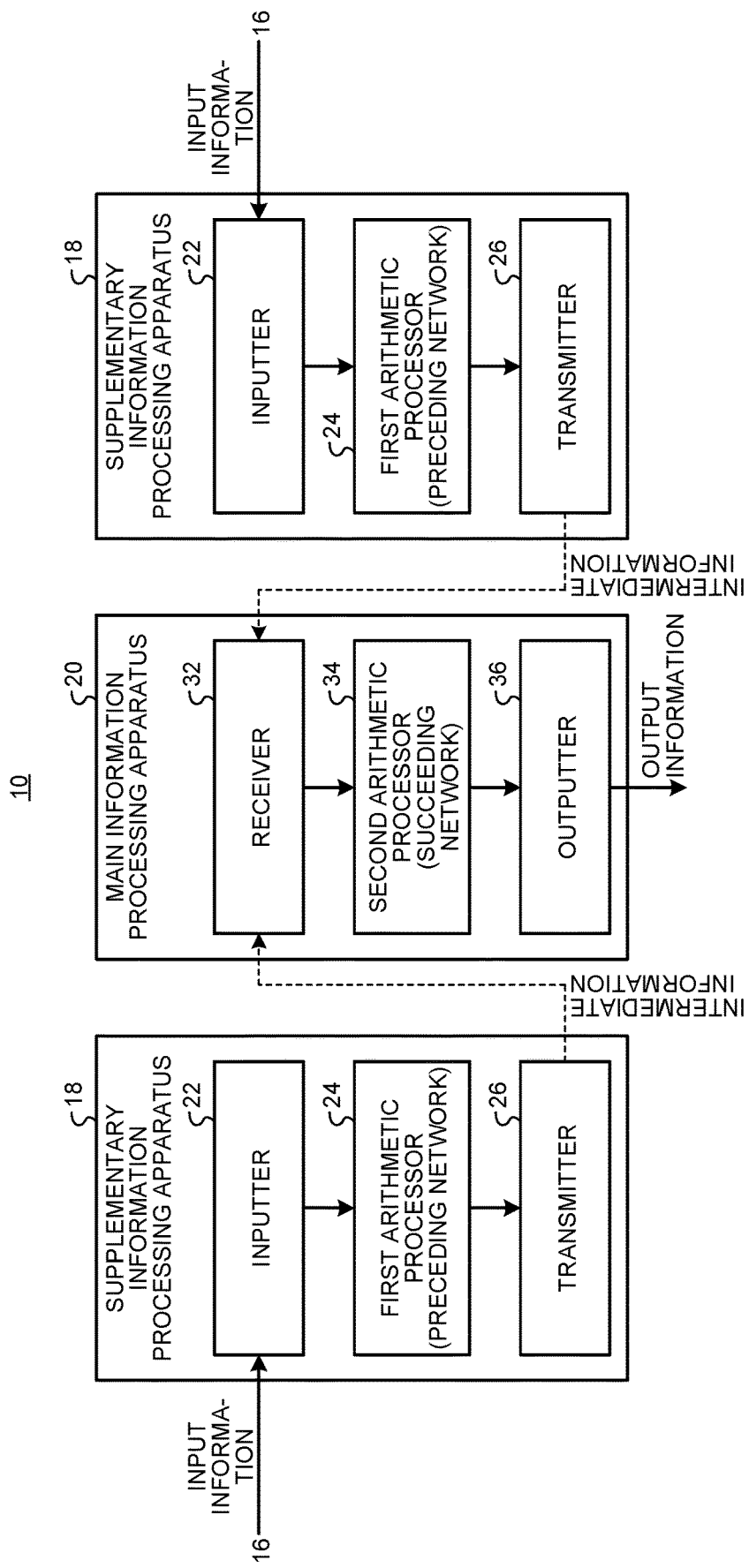
FIG. 2 is a block diagram of supplementary information processing apparatuses and a main information processing apparatus according to a first embodiment.

FIG. 2 is a block diagram of the supplementary information processing apparatuses 18 and the main information processing apparatus 20 according to the first embodiment.

The supplementary information processing apparatuses 18 each execute a predetermined computer program to function as an inputter 22, a first arithmetic processor (processing unit) 24, and a transmitter 26. In other words, the supplementary information processing apparatus 18 includes the inputter 22, the first arithmetic processor 24, and the transmitter 26.

The main information processing apparatus 20 executes a predetermined computer program to function as a receiver 32, a second arithmetic processor (processing unit) 34, and an outputter 36. In other words, the main information processing apparatus 20 includes the receiver 32, the second arithmetic processor 34, and the outputter 36.

The inputter 22 acquires the input information output from the information acquisition device. In this embodiment, the inputter 22 periodically acquires the image data captured by the camera 16.

The first arithmetic processor 24 executes arithmetic processing using a preceding network on the input information acquired by the inputter 22. The preceding network is a portion from an input layer to a boundary layer located at a predetermined position in a first neural network. The first neural network and the preceding network will be described in detail later.

The transmitter 26 acquires intermediate information indicating an arithmetic result of the arithmetic processing using the preceding network at the first arithmetic processor 24, from the first arithmetic processor 24. The transmitter 26 then transmits the intermediate information to the main information processing apparatus 20 via the communication network.

The receiver 32 receives the intermediate information from each of the supplementary information processing apparatuses 18 via the communication network.

Each time the receiver 32 receives the intermediate information, the second arithmetic processor 34 executes arithmetic processing using a succeeding network on the received intermediate information. The succeeding network is a portion from a layer subsequent to the boundary layer to an output layer in the first neural network. The succeeding network will be described in detail later.

The outputter 36 acquires the arithmetic result of the arithmetic processing using the succeeding network, from the second arithmetic processor 34. The outputter 36 then outputs output information indicating the arithmetic result of the arithmetic processing using the succeeding network, to an external apparatus. For example, the outputter 36 transmits the output information to a user terminal apparatus or displays the output information on a display apparatus. In this embodiment, the outputter 36 outputs output information indicating whether a suspicious person or the like is present in the area under surveillance and indicating a partial region where the suspicious person or the like is present.

This information processing system 10 uses two apparatuses, the supplementary information processing apparatus 18 and the main information processing apparatus 20, to execute arithmetic processing using the first neural network. This enables the information processing system 10 to execute the arithmetic processing using the first neural network while distributing the arithmetic processing between the two apparatuses.

Note that two supplementary information processing apparatuses 18 are illustrated in FIG. 2; however, the information processing system 10 may include at least one supplementary information processing apparatus 18. In other words, the information processing system 10 may include one supplementary information processing apparatus 18, or may include three or more supplementary information processing apparatuses 18.

FIG. 3 is a diagram illustrating an example configuration of the first neural network. The first neural network may be any network having a configuration in which information is not fed back from one of the layers in the succeeding network to one of the layers in the preceding network.

For example, as in the present embodiment, when a system is configured to monitor whether a suspicious person or the like is present in an area under surveillance with the input information being image data captured by the cameras 16, the first neural network may be the Residual-network as conventionally disclosed. FIG. 3 illustrates an example Residual-network configuration having 34 convolutional layers.

The preceding network is a partial network in the preceding stage of the first neural network. The succeeding network is a partial network in the succeeding stage of the first neural network excluding the preceding network portion. In other words, the first neural network is a network in which the succeeding network is connected to the preceding network.

The boundary layer, which is the last stage of the preceding network, is set at a position where the information amount of an output value is less than that of input information (for example, the image data captured by the cameras 16). That is, the intermediate information indicating an arithmetic result of the arithmetic processing using the preceding network has less information amount than that of the input information. For example, the intermediate information contains fewer numerical values than those contained in the input information.

With this configuration, the information processing system 10 can reduce a communication load on the communication network in comparison with a case where the input information is transmitted, as it is, from the supplementary information processing apparatus 18 to the main information processing apparatus 20 and the main information processing apparatus 20 executes the arithmetic processing using the first neural network. Furthermore, the main information processing apparatus 20 can execute the arithmetic processing with less processing amount than when the arithmetic processing is executed using the first neural network on the input information.

Note that the preceding networks used by the supplementary information processing apparatuses 18 may have common or different parameters (weight and bias) as long as the preceding networks have the same network configuration. For example, parameters set for the first neural network preliminarily trained by a learning apparatus may be set for the preceding networks. Furthermore, after common parameters are set for the preceding networks, the parameters may be adapted to each of the supplementary information processing apparatuses 18.

Figure 4:
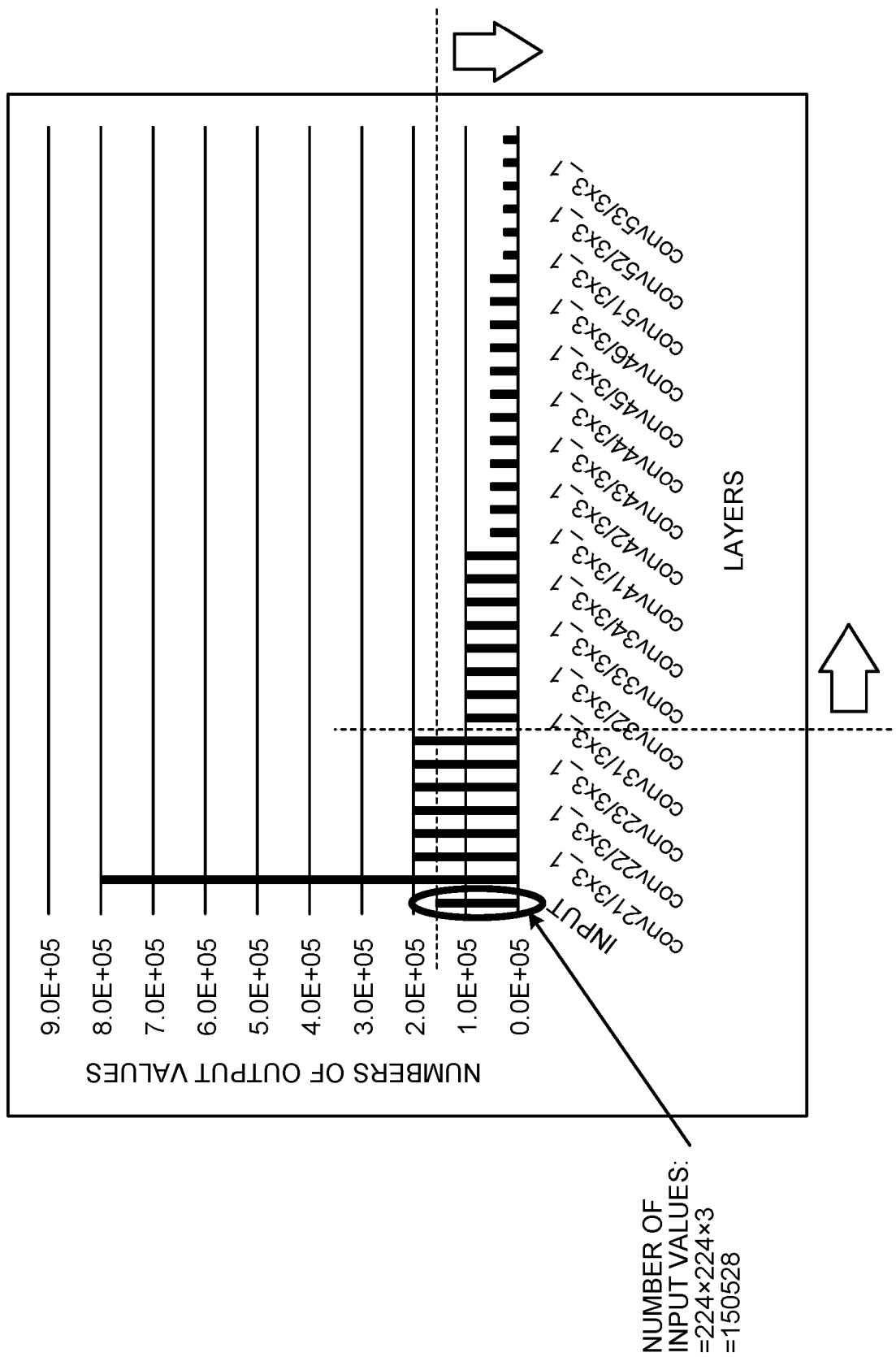
FIG. 4 is a diagram illustrating the number of arithmetic results in each layer.

FIG. 4 is a diagram illustrating the number of arithmetic results in each layer in the Residual-network including 34 convolutional layers.

Five types of Residual-networks including 18, 34, 50, 101, and 152 convolutional layers are conventionally disclosed. Each of the neural networks receives input image data indicating an image having 224×224 pixels each of which is composed of three colors of red, blue and green. Thus, each of the neural networks receives the input image data containing a total of 224×224×3=150528 numerical values.

The numbers of numerical values output from convolutional layers in these five types of neural networks are as follows.

In the Residual-network including 18 convolutional layers, the 7th convolutional layer from the input layer outputs 28×28×128=100352 numerical values. In the Residual-network including 34 convolutional layers, the 9th convolutional layer from the input layer outputs 28×28×128=100352 numerical values. In the Residual-network including 50 convolutional layers, the 12th convolutional layer from the input layer outputs 28×28×128=100352 numerical values. In the Residual-network including 101 convolutional layers, the 12th convolutional layer from the input layer outputs 28×28×128=100352 numerical values. In the Residual-network including 152 convolutional layers, the 12th convolutional layer from the input layer outputs 28×28×128=100352 numerical values.

All of the aforementioned convolutional layers output fewer numerical values than those contained in the input image data. Thus, the information processing system 10 can reduce communication traffic by, for example, setting each of the aforementioned convolutional layers as the boundary layer, in comparison with a case of transmitting the input image data to the main information processing apparatus 20 as it is.

In the Residual-network, as a general tendency, as the convolutional layer is located deeper, a plurality of numerical values output from the layer include a smaller number of numerical values corresponding to the size of an image (that is, 224×224) and a larger number of numerical values corresponding to red, blue, and green (that is, 3).

Furthermore, when the numbers of the numerical values output from the convolutional layers vary in the Residual-network, as a general tendency, the number of the numerical values corresponding to the size of an image is halved both vertically and horizontally, and the number of the numerical values corresponding to red, blue, and green is doubled. That is, when the numbers of the numerical values output from the convolutional layers vary in the Residual-network, the number of numerical values output from a convolutional layer is halved.

Thus, the information processing system 10 may be able to reduce communication traffic by setting, as the boundary layer, a layer subsequent to the aforementioned convolutional layers, not limited to the aforementioned convolutional layers, in comparison with the case of transmitting the input image data to the main information processing apparatus 20 as it is. In other words, a layer set as the boundary layer is not limited to the aforementioned convolutional layers.

In specific, in the Residual-network including 18 or 34 convolutional layers, as the convolutional layer is located deeper, the number of the numerical values output from the layer is smaller or the same. Thus, the number of the numerical values output from each of the 7th and subsequent convolutional layers in the Residual-network including 18 convolutional layers is smaller than the number of the numerical values contained in the input image data, 150528. For example, in the Residual-network including 18 convolutional layers, the 11th convolutional layer outputs 14×14×256=50176 numerical values, and the 15th convolutional layer outputs 7×7×512=25088 numerical values. The number of the numerical values output from each of the 9th and subsequent convolutional layers in the Residual-network including 34 convolutional layers is also smaller than the number of the numerical values of the input image data, 150528. For example, in the Residual-network including 34 convolutional layers, the 17th convolutional layer outputs 14×14×256=50176 numerical values, and the 29th convolutional layer outputs 7×7×512=25088 numerical values.

In the Residual-network including 50, 101, or 152 convolutional layers, as the convolutional layer is located deeper, the number of the numerical values output from the layer may be larger in some cases, but is smaller as a general tendency. For example, in the Residual-network including 50 convolutional layers, the 24th convolutional layer outputs 14×14-256=50176 numerical values, and the 42nd convolutional layer outputs 7×7×512=25088 numerical values. For example, in the Residual-network including 101 convolutional layers, the 24th convolutional layer outputs 14×14-256=50176 numerical values, and the 93rd convolutional layer outputs 7×7×512=25088 numerical values. For example, in the Residual-network including 152 convolutional layers, the 36th convolutional layer outputs 14×14×256=50176 numerical values, and the 144th convolutional layer outputs 7×7×512=25088 numerical values.

As described above, each of the convolutional layers subsequent to the 7th layer in the Residual-network including 18 convolutional layers, the 9th layer in the Residual-network including 34 convolutional layers, the 12th layer in the Residual-network including 50 convolutional layers, the 12th layer in the Residual-network including 101 convolutional layers, and the 12th layer in the Residual-network including 152 convolutional layers outputs fewer numerical values than those of the input image data. Thus, the information processing system 10 can reduce communication traffic by, for example, setting any layer subsequent to the aforementioned convolutional layers as the boundary layer, in comparison with the case of transmitting the input image to the main information processing apparatus 20 as it is.

Note that the tendency in which a deeper convolutional layer outputs a smaller number of numerical values is not limited to Residual-networks and is found in all types of neural networks. That is, if a neural network other than Residual-networks is used as the first neural network, a layer that outputs less information amount than that of the input information is present. Thus, the information processing system 10 can reduce communication traffic by setting a layer outputting less information amount than that of the input information as the boundary layer in the first neural network, in comparison with the case of transmitting the input information to the main information processing apparatus 20 as it is.

Figure 5:
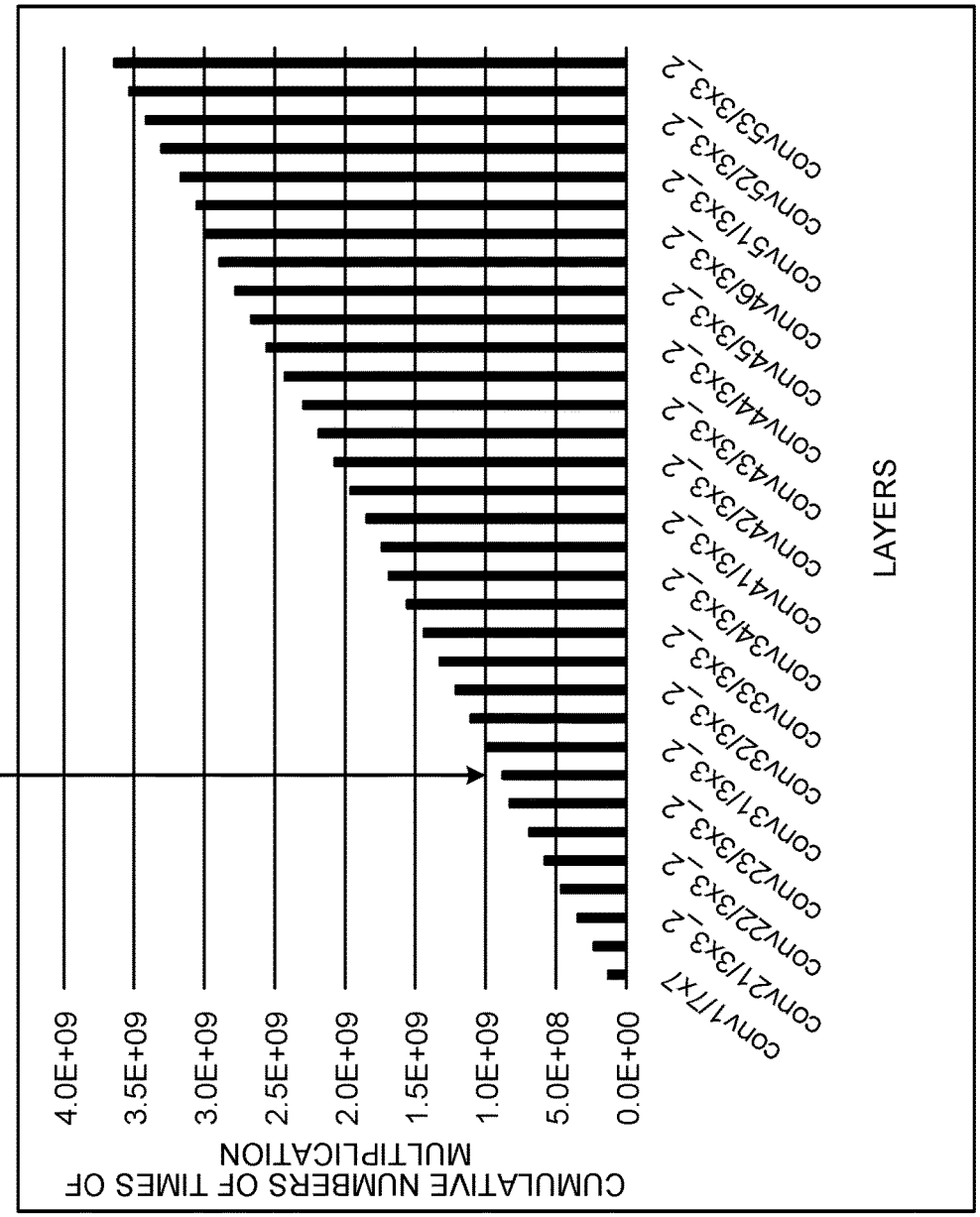
FIG. 5 is a diagram illustrating the cumulative number of times of multiplication for each layer.

FIG. 5 is a diagram illustrating the cumulative number of times of multiplication for each layer in the Residual-network including 34 convolutional layers.

Arithmetic processing using a neural network includes a large number of multiplication processes and a large number of addition processes. A computer executing arithmetic processing using a neural network should thus have high arithmetic capacity. In the edge computing system, the edge apparatus 12 (supplementary information processing apparatus 18) typically has lower arithmetic capacity than that of the data center 14 (main information processing apparatus 20). Thus, the boundary layer is preferably set such that the processing amount of the arithmetic processing using the preceding network is less than the processing amount of the arithmetic processing using the succeeding network. For example, the boundary layer is preferably set to a layer at which the cumulative number of times of multiplication from the input layer is equal to or less than the number of times preset in accordance with the arithmetic capacity of the edge apparatus 12. With this setting, the edge apparatus 12 (supplementary information processing apparatus 18) can execute the arithmetic processing using the preceding network within a certain processing time with low arithmetic capacity. In other words, with the main information processing apparatus 20 alone having high arithmetic capacity and with the supplementary information processing apparatus 18 not having high arithmetic capacity, the information processing system 10 can process high-volume input information at high speed.

Furthermore, the information processing system 10 executes the arithmetic processing using the first neural network while distributing the arithmetic processing between the edge apparatus 12 (supplementary information processing apparatus 18) and the data center 14 (main information processing apparatus 20). Thus, the information processing system 10 can reduce the arithmetic capacity of the data center 14 (main information processing apparatus 20) in comparison with a case where the data center 14 (main information processing apparatus 20) alone executes the arithmetic processing using the first neural network.

Second Embodiment

Next, the information processing system 10 according to a second embodiment will be described. The information processing system 10 according to the second embodiment has substantially the same functions and configuration as those in the first embodiment. In description of the information processing system 10 according to the second embodiment, apparatuses and units having substantially the same functions and configurations as those in the first embodiment are denoted by the same reference signs, and their detailed description except for differences is omitted.

Figure 6:
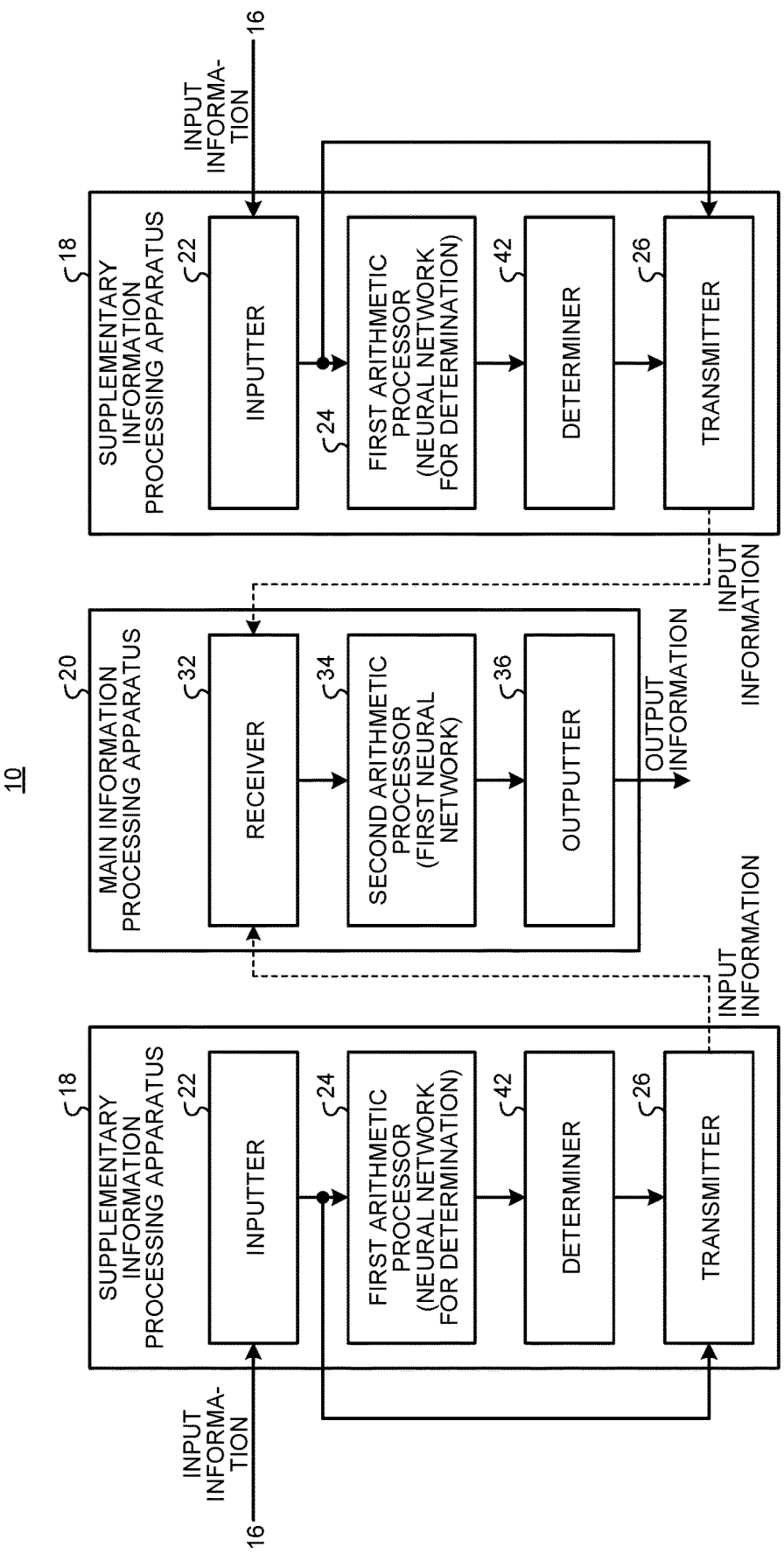
FIG. 6 is a block diagram of supplementary information processing apparatuses and a main information processing apparatus according to a second embodiment.

FIG. 6 is a block diagram of the supplementary information processing apparatuses 18 and the main information processing apparatus 20 according to the second embodiment.

In the second embodiment, the receiver 32 receives input information from each of a plurality of the supplementary information processing apparatuses 18 via a communication network. In the second embodiment, each time the receiver 32 receives the input information, the second arithmetic processor 34 executes arithmetic processing using the first neural network on the received input information. In the second embodiment, the outputter 36 acquires an arithmetic result of the arithmetic processing using the first neural network from the second arithmetic processor 34. The outputter 36 then outputs output information indicating the arithmetic result of the arithmetic processing using the first neural network, to an external apparatus.

Each of the supplementary information processing apparatuses 18 according to the second embodiment further includes a determiner 42. In the second embodiment, the first arithmetic processor 24 executes arithmetic processing using a neural network for determination, on the input information acquired by the inputter 22.

The neural network for determination has fewer processes than those in the first neural network. Thus, the processing amount of the arithmetic processing using the neural network for determination is less than the processing amount of the arithmetic processing using the first neural network. Furthermore, the neural network for determination learns in such a manner that it receives the same input information as that for the first neural network and outputs the same arithmetic result as that of the first neural network. Unfortunately, because the neural network for determination has fewer processes than those in the first neural network, the arithmetic result of the arithmetic processing using the neural network for determination is less accurate than that of the arithmetic processing using the first neural network although the former is similar to the latter. However, the neural network for determination having fewer processes allows the supplementary information processing apparatus 18 even with low arithmetic capacity to execute the arithmetic processing using the neural network for determination at high speed.

The determiner 42 determines whether the input information is to be transmitted to the main information processing apparatus 20 in accordance with the arithmetic result of the arithmetic processing using the neural network for determination at the first arithmetic processor 24. In this embodiment, if an output arithmetic result indicates that a suspicious person is present in image data being the input information, the determiner 42 determines that "the input information is to be transmitted to the main information processing apparatus 20".

The transmitter 26 according to the second embodiment acquires the input information from the inputter 22. If the determiner 42 determines that "the input information is to be transmitted to the main information processing apparatus 20", the transmitter 26 transmits the input information acquired from the inputter 22 to the main information processing apparatus 20 via the communication network. On the other hand, if the determiner 42 determines that "the input information is not to be transmitted to the main information processing apparatus 20", the transmitter 26 does not transmit the information to the main information processing apparatus 20.

Note that the transmitter 26 may transmit the input information to the main information processing apparatus 20 in accordance with a plurality of results of determination made by the determiner 42 for a plurality of pieces of the input information generated at different times. For example, if the determiner 42 determines that "the input information is to be transmitted to the main information processing apparatus 20" N consecutive times (N is an integer of 2 or greater), the transmitter 26 transmits the input information to the main information processing apparatus 20. Alternatively, for example, in cases other than a case where the determiner 42 determines that "the input information is not to be transmitted to the main information processing apparatus 20" N consecutive times (N is an integer of 2 or greater), the transmitter 26 may transmit the input information to the main information processing apparatus 20. This allows the supplementary information processing apparatus 18 to control transmission of the input information to the main information processing apparatus 20 with accuracy close to that in a case where it is determined whether the input information is to be transmitted to the main information processing apparatus 20 on the basis of the arithmetic result of the arithmetic processing using the first neural network.

In this way, if the information processing system 10 according to the second embodiment determines that "the input information is to be transmitted to the main information processing apparatus 20", the information processing system 10 transmits the input information from the supplementary information processing apparatus 18 to the main information processing apparatus 20. On the other hand, if the information processing system 10 according to the second embodiment determines that "the input information is not to be transmitted to the main information processing apparatus 20", the supplementary information processing apparatus 18 does not transmit the input information to the main information processing apparatus 20. With this configuration, the information processing system 10 according to the second embodiment can reduce a communication load on the communication network in comparison with a case where all pieces of the received input information are transmitted from the supplementary information processing apparatus 18 to the main information processing apparatus 20.

Figure 7:
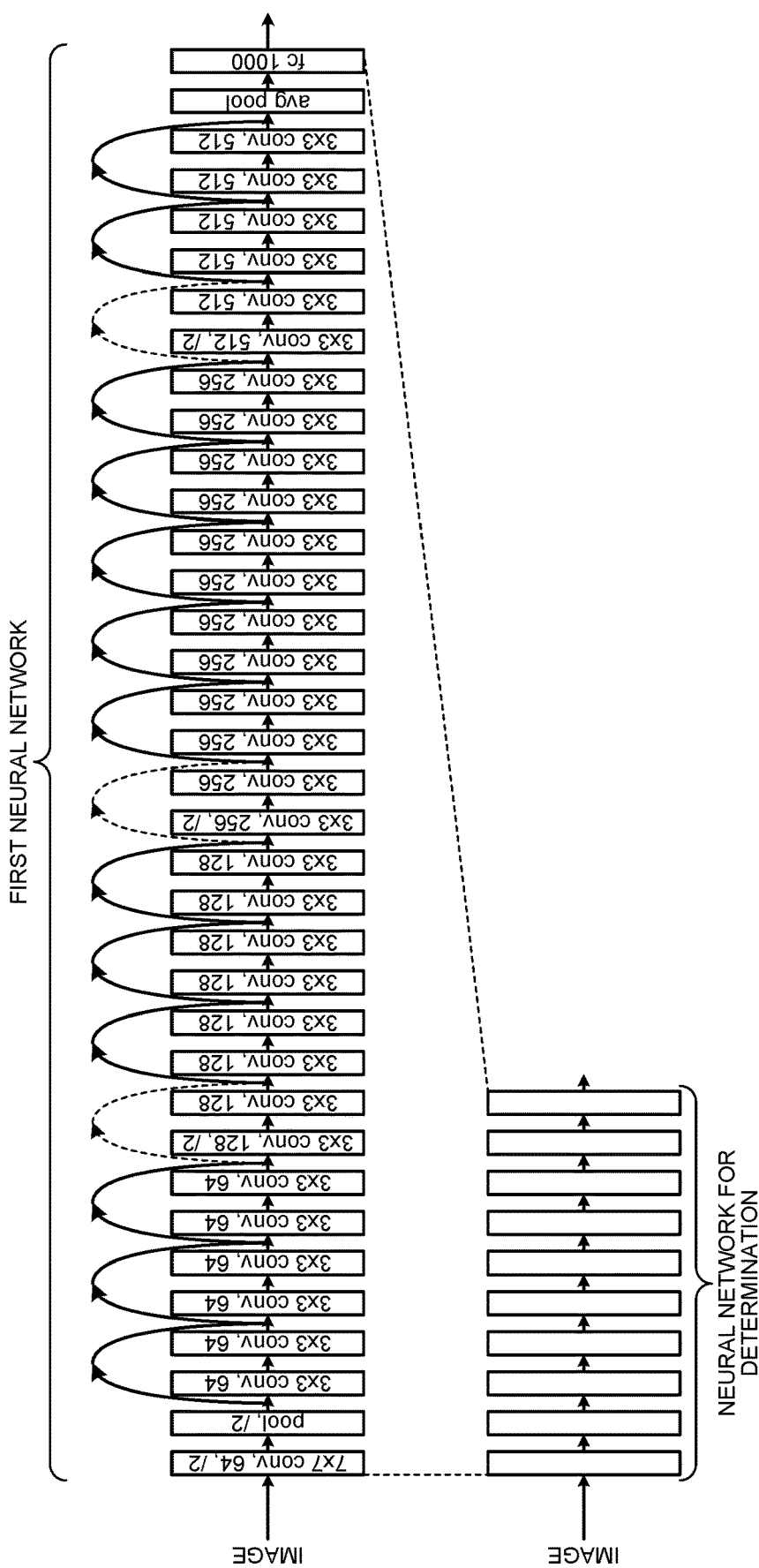
FIG. 7 is a diagram illustrating an example configuration of a neural network according to the second embodiment.

FIG. 7 is a diagram illustrating an example configuration of the first neural network and the neural network for determination according to the second embodiment.

In the information processing system 10 according to the second embodiment, the main information processing apparatus 20 executes the arithmetic processing using the first neural network. In the second embodiment, the supplementary information processing apparatus 18 executes the arithmetic processing using the neural network for determination having fewer processes than those in the first neural network.

The supplementary information processing apparatus 18 typically has lower arithmetic processing capacity than that of the main information processing apparatus 20. It is thus not practical that the supplementary information processing apparatus 18 executes arithmetic processing using the same first neural network as that for the main information processing apparatus 20. However, the supplementary information processing apparatus 18 can execute the arithmetic processing using the neural network for determination that has fewer processes than those in the first neural network for the main information processing apparatus 20 and that can yield the same arithmetic result as or a similar arithmetic result to that from the main information processing apparatus 20.

There is typically a trade-off between the number of processes in a neural network and the accuracy of its arithmetic processing results. Thus, the arithmetic processing using the neural network for determination having fewer processes than those in the first neural network yields results with lower accuracy than the accuracy of results of the arithmetic processing using the first neural network. However, the supplementary information processing apparatus 18 executes the arithmetic processing using the neural network for determination and can thus yield a similar result to that yielded when the main information processing apparatus 20 executes the arithmetic processing using the first neural network. Thus, for example, only when the supplementary information processing apparatus 18 executes, on the image data output from the camera 16, the arithmetic processing using the neural network for determination and determines that a surveillance target is detected on the basis of a yielded result, the supplementary information processing apparatus 18 can transmit the image data to the main information processing apparatus 20. With this configuration, the information processing system 10 according to the second embodiment can reduce the number of times of or the frequency of transmission of the image data, in comparison with a case where all pieces of the image data output from the camera 16 are transmitted from the supplementary information processing apparatus 18 to the main information processing apparatus 20. Thus, the information processing system 10 according to the second embodiment can reduce communication traffic between the main information processing apparatus 20 and the supplementary information processing apparatus 18. Furthermore, the information processing system 10 according to the second embodiment, for example, reduces the number of pieces of the image data processed by the main information processing apparatus 20 and can thus also reduce the volume of the arithmetic processing at the main information processing apparatus 20.

Note that the supplementary information processing apparatus 18 need not transmit the image data at each determination that the transmission is needed. Only when the determination of whether the input information is to be transmitted to the main information processing apparatus 20 yields a result that "the input information is to be transmitted to the main information processing apparatus 20" N consecutive times (N is an integer of 2 or greater), for example, the supplementary information processing apparatus 18 may transmit the image data to the main information processing apparatus 20. Alternatively, in cases other than a case where the determination of whether the input information is to be transmitted to the main information processing apparatus 20 yields a result that "the input information is not to be transmitted to the main information processing apparatus 20" N consecutive times (N is an integer of 2 or greater), for example, the supplementary information processing apparatus 18 may transmit the image data to the main information processing apparatus 20. This allows the information processing system 10 according to the second embodiment to reduce the effect of disadvantage in which the accuracy of results of the arithmetic processing using the neural network for determination is low.

Third Embodiment

Next, the information processing system 10 according to a third embodiment will be described. The information processing system 10 according to the third embodiment has substantially the same functions and configuration as those in the first embodiment. In description of the information processing system 10 according to the third embodiment, apparatuses and units having substantially the same functions and configurations as those in the first embodiment are denoted by the same reference signs, and their detailed description except for differences is omitted.

Figure 8:
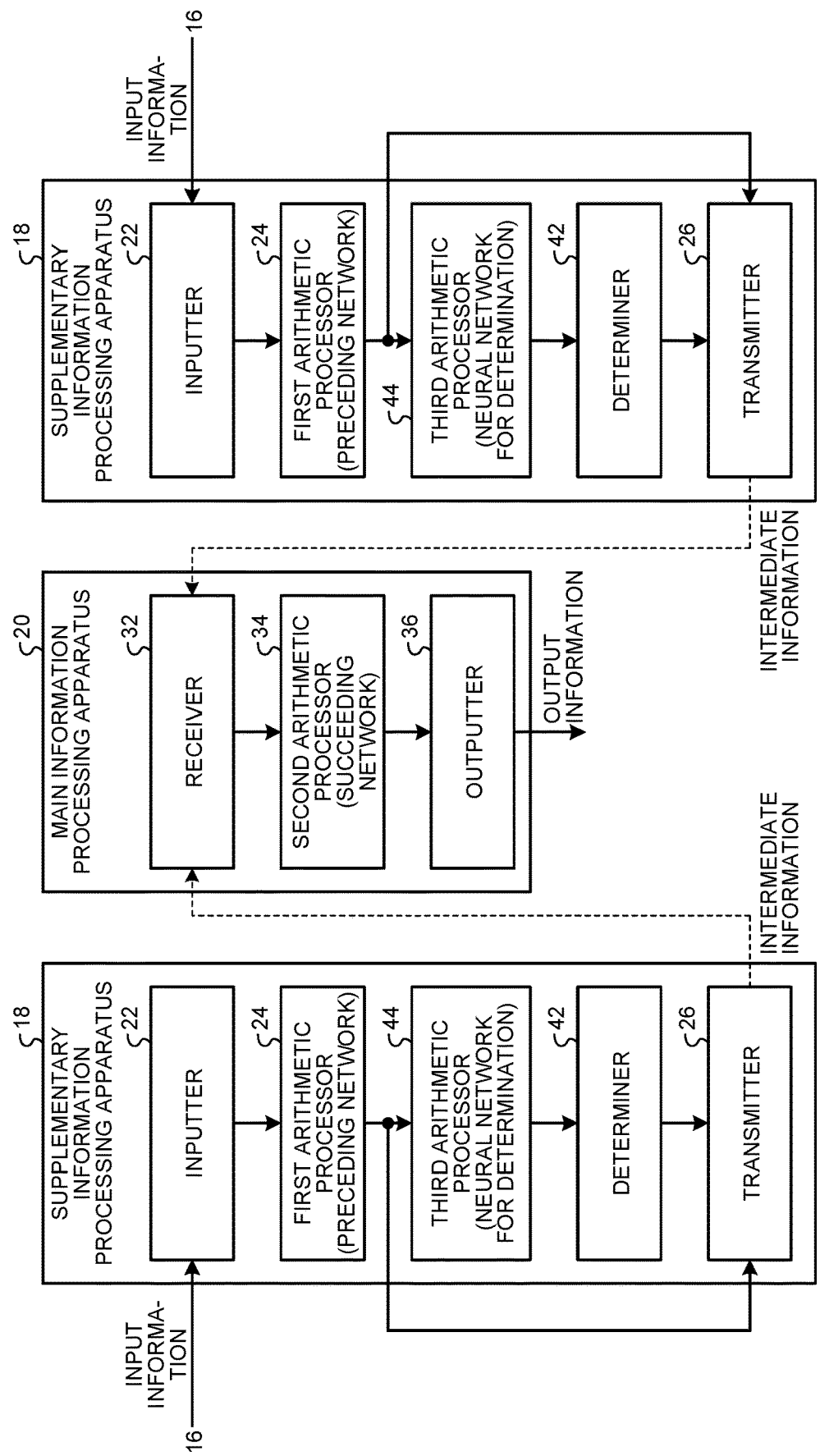
FIG. 8 is a block diagram of supplementary information processing apparatuses and a main information processing apparatus according to a third embodiment.

FIG. 8 is a block diagram of the supplementary information processing apparatuses 18 and the main information processing apparatus 20 according to the third embodiment.

In the third embodiment, the main information processing apparatus 20 has the same configuration and functions as that in the first embodiment. In the third embodiment, the inputter 22 and the first arithmetic processor 24 have the same configurations and functions as those in the first embodiment.

A plurality of the supplementary information processing apparatuses 18 according to the third embodiment each further include a third arithmetic processor 44 and the determiner 42.

The third arithmetic processor 44 executes arithmetic processing using a preliminarily trained neural network for determination, on intermediate information output from the first arithmetic processor 24.

The neural network for determination has fewer processes than those in the succeeding network. Thus, the processing amount of the arithmetic processing using the neural network for determination is less than the processing amount of the arithmetic processing using the succeeding network. Furthermore, the neural network for determination learns in such a manner that it receives the same information (intermediate information) as that for the succeeding network and outputs the same arithmetic result as that of the succeeding network. Unfortunately, because the neural network for determination has fewer processes than those in the succeeding network, the arithmetic result of the arithmetic processing using the neural network for determination is less accurate than that of the arithmetic processing using the succeeding network although the former is similar to the latter. However, the neural network for determination having fewer processes allows the supplementary information processing apparatus 18 even with low arithmetic capacity to execute the arithmetic processing using the neural network for determination.

The determiner 42 determines whether the intermediate information is to be transmitted to the main information processing apparatus 20 in accordance with the arithmetic result of the arithmetic processing using the neural network for determination at the third arithmetic processor 44. In this embodiment, if an output arithmetic result indicates that a suspicious person or the like is present in image data being input information, the determiner 42 determines that the intermediate information is to be transmitted to the main information processing apparatus 20.

The transmitter 26 according to the third embodiment acquires the intermediate information from the first arithmetic processor 24. If the determiner 42 determines that "the intermediate information is to be transmitted to the main information processing apparatus 20", the transmitter 26 transmits the intermediate information acquired from the first arithmetic processor 24 to the main information processing apparatus 20. On the other hand, if the determiner 42 determines that "the intermediate information is not to be transmitted to the main information processing apparatus 20", the transmitter 26 transmits no information to the main information processing apparatus 20.

Note that the transmitter 26 may transmit the intermediate information to the main information processing apparatus 20 in accordance with a plurality of results of determination of whether the intermediate information is to be transmitted to the main information processing apparatus 20 made by the determiner 42 for a plurality of pieces of the input information generated at different times. For example, if the determiner 42 determines that "the intermediate information is to be transmitted to the main information processing apparatus 20" N consecutive times (N is an integer of 2 or greater), the transmitter 26 transmits the intermediate information to the main information processing apparatus 20. Alternatively, for example, in cases other than a case where the determiner 42 determines that "the intermediate information is not to be transmitted to the main information processing apparatus 20" N consecutive times (N is an integer of 2 or greater), the transmitter 26 may transmit the intermediate information to the main information processing apparatus 20. This allows the supplementary information processing apparatus 18 to control transmission of the intermediate information to the main information processing apparatus 20 with accuracy close to that in a case where it is determined whether the intermediate information is to be transmitted to the main information processing apparatus 20 on the basis of the arithmetic result of the arithmetic processing using the succeeding network.

In this way, if the information processing system 10 according to the third embodiment determines that "the intermediate information is to be transmitted to the main information processing apparatus 20", the information processing system 10 transmits the intermediate information from the supplementary information processing apparatus 18 to the main information processing apparatus 20. On the other hand, if the information processing system 10 according to the third embodiment determines that "the intermediate information is not to be transmitted to the main information processing apparatus 20", the information processing system 10 does not transmit the intermediate information from the supplementary information processing apparatus 18 to the main information processing apparatus 20. With this configuration, the information processing system 10 according to the third embodiment can reduce a communication load on the communication network in comparison with a case where all pieces of the generated intermediate information are transmitted from the supplementary information processing apparatus 18 to the main information processing apparatus 20.

Figure 9:
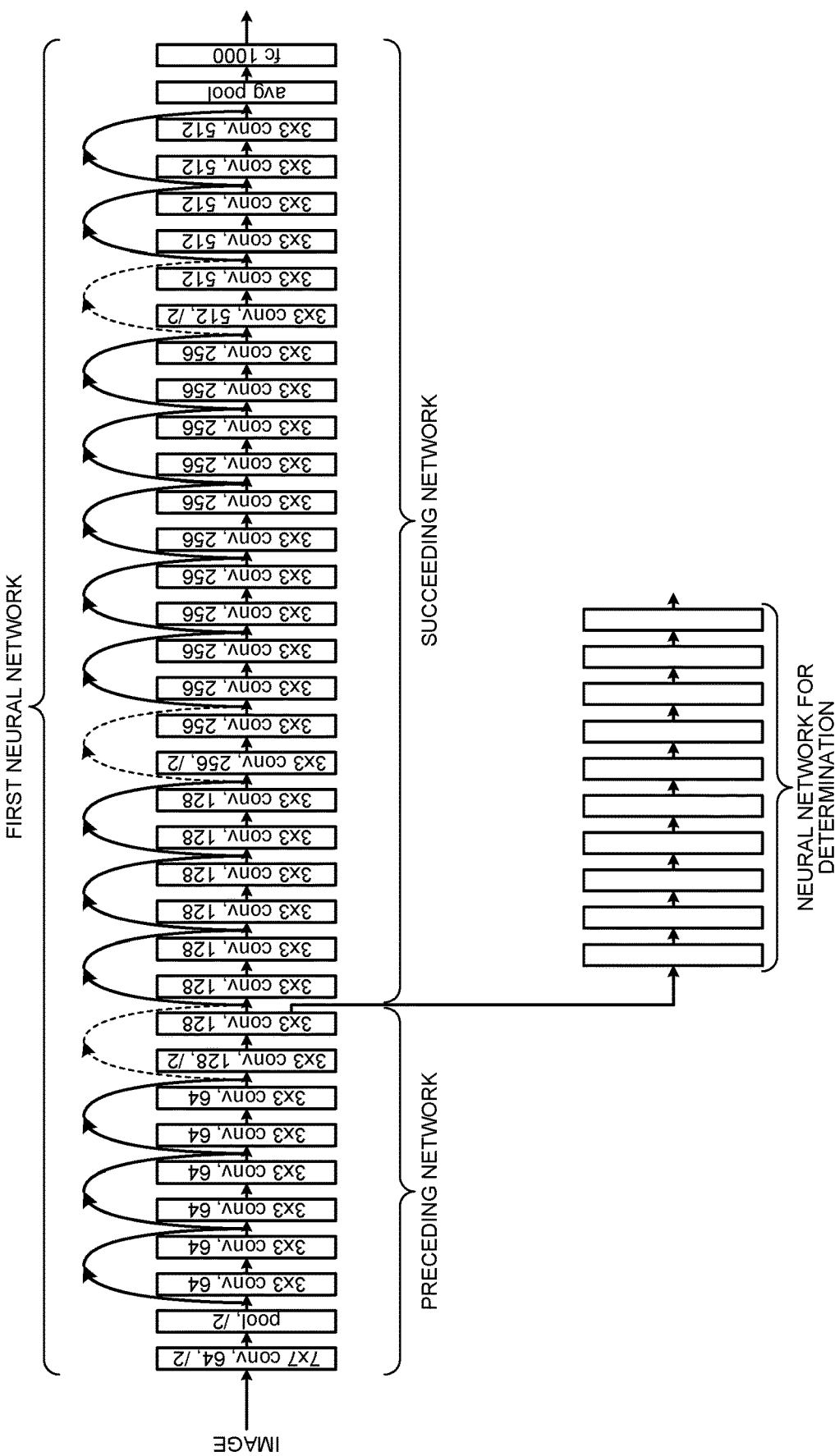
FIG. 9 is a diagram illustrating an example configuration of a neural network according to the third embodiment.

FIG. 9 is a diagram illustrating an example configuration of the first neural network and the neural network for determination according to the third embodiment.

In the information processing system 10 according to the third embodiment, the main information processing apparatus 20 executes the arithmetic processing using the succeeding network from the layer subsequent to the boundary layer to the output layer in the first neural network. In the third embodiment, the supplementary information processing apparatus 18 executes the arithmetic processing using the preceding network from the input layer to the boundary layer located at the predetermined position in the first neural network, and the arithmetic processing using the neural network for determination having fewer processes than those in the succeeding network.

As described in the first embodiment, numerical values contained in an arithmetic result of arithmetic processing using a neural network output from an intermediate layer tends to be fewer than those contained in input information input to the neural network. The supplementary information processing apparatus 18 according to the third embodiment executes the arithmetic processing up to a layer that outputs fewer numerical values than those contained in the input information input to the neural network and transmits the result to the main information processing apparatus 20. With this configuration, the information processing system 10 according to the third embodiment can reduce a communication load on the communication network in comparison with a case where the input information is transmitted from the supplementary information processing apparatus 18 to the main information processing apparatus 20.

Furthermore, the supplementary information processing apparatus 18 according to the third embodiment successively executes the arithmetic processing using the neural network for determination, on the arithmetic result output from the preceding network. The supplementary information processing apparatus 18 then determines whether the intermediate information is to be transmitted to the main information processing apparatus 20 on the basis of the arithmetic result of the arithmetic processing using the neural network for determination. If the supplementary information processing apparatus 18 determines that "the intermediate information is to be transmitted to the main information processing apparatus 20", the supplementary information processing apparatus 18 then transmits the intermediate information to the main information processing apparatus 20.

With this configuration, the information processing system 10 according to the third embodiment can reduce the number of times of or the frequency of transmission of the intermediate information, in comparison with a case where all pieces of the acquired input information are transmitted from the supplementary information processing apparatus 18 to the main information processing apparatus 20. Thus, the information processing system 10 according to the third embodiment can further reduce communication traffic between the main information processing apparatus 20 and the supplementary information processing apparatus 18. Furthermore, the information processing system 10 according to the third embodiment, for example, reduces the number of pieces of information processed by the main information processing apparatus 20 and can thus also reduce the volume of the arithmetic processing at the main information processing apparatus 20.

Note that the supplementary information processing apparatus 18 need not transmit the intermediate information at each determination that the transmission is needed. Only when the determination of whether the intermediate information is to be transmitted to the main information processing apparatus 20 yields a result that "the intermediate information is to be transmitted to the main information processing apparatus 20" N consecutive times (N is an integer of 2 or greater), for example, the supplementary information processing apparatus 18 may transmit the intermediate information to the main information processing apparatus 20. Alternatively, in cases other than a case where the determination of whether the intermediate information is to be transmitted to the main information processing apparatus 20 yields a result that "the intermediate information is not to be transmitted to the main information processing apparatus 20" N consecutive times (N is an integer of 2 or greater), for example, the supplementary information processing apparatus 18 may transmit the intermediate information to the main information processing apparatus 20. This allows the information processing system 10 according to the third embodiment to reduce the effect of disadvantage in which the accuracy of results of the arithmetic processing using the neural network for determination is low.

Hardware Configuration

Figure 10:
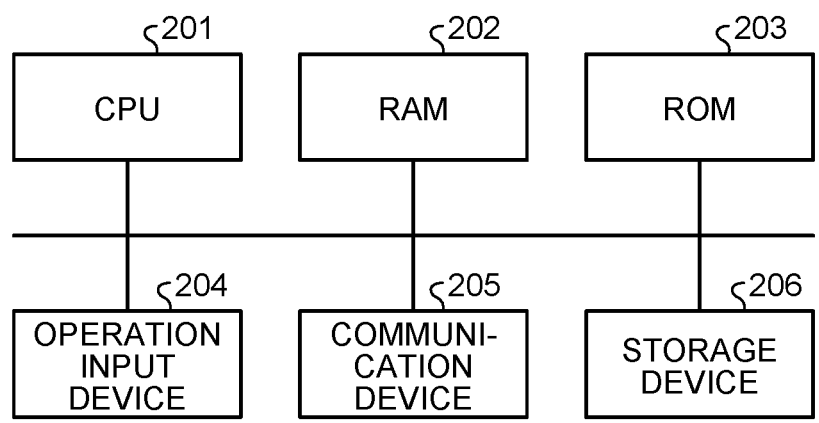
FIG. 10 is a diagram illustrating a hardware configuration of the supplementary information processing apparatus and the main information processing apparatus.

FIG. 10 is a diagram illustrating example hardware configuration of the supplementary information processing apparatus 18 and the main information processing apparatus 20 according to the embodiments. The supplementary information processing apparatus 18 and the main information processing apparatus 20 according to the embodiments are implemented by an information processing apparatus having a hardware configuration illustrated in FIG. 10, for example. The supplementary information processing apparatus 18 and the main information processing apparatus 20 include a central processing unit (CPU) 201, random access memory (RAM) 202, read only memory (ROM) 203, an operation input device 204, a communication device 205, and a storage device 206. These constituents are connected using a bus.

The CPU 201 is a processor executing arithmetic processing, control processing, and the like, following a computer program. The CPU 201 operates with the computer program stored in the ROM 203, the storage device 206, and the like to execute various types of processing in a work area that is a predetermined area in the RAM 202.

The RAM 202 is memory, such as synchronous dynamic random access memory (SDRAM). The RAM 202 functions as the work area for the CPU 201. The ROM 203 is memory storing the computer program and various types of information in a non-rewritable manner.

The operation input device 204 is an input device, such as a mouse and a keyboard. The operation input device 204 receives information input by user operation as an instruction signal and outputs the instruction signal to the CPU 201.

The storage device 206 is a device to write and read data to and from a semiconductor storage medium, such as flash memory, a magnetically or optically recordable storage medium, or the like. The storage device 206 writes and reads data to and from the storage medium in response to control from the CPU 201. The communication device 205 communicates with an external device via a communication network in response to control from the CPU 201.

The supplementary information processing apparatus 18 executes a computer program including an input module, a first arithmetic processing module, and a transmission module. The computer program executed by the supplementary information processing apparatus 18 may further include a determination module and a third arithmetic processing module. This computer program is loaded and executed on the RAM 202 by the CPU 201 (processor) to enable the information processing apparatus to function as the inputter 22, the first arithmetic processor 24, and the transmitter 26. This computer program may further enable the information processing apparatus to function as the determiner 42 and the third arithmetic processor 44.

The main information processing apparatus 20 executes a computer program including a reception module, a second arithmetic processing module, and an output module. This computer program is loaded and executed on the RAM 202 by the CPU 201 (processor) to enable the information processing apparatus to function as the receiver 32, the second arithmetic processor 34, and the outputter 36.

The computer program executed by the supplementary information processing apparatus 18 of the embodiments is provided while being recorded as a file that can be installed in or executed by a computer in a computer-readable recording medium, such as a CD-ROM, a flexible disk, a CD-R, and a digital versatile disc (DVD).

Alternatively, the computer program executed by the supplementary information processing apparatus 18 of the embodiments may be configured to be stored in a computer connected to a communication network, such as the Internet, and to be provided through downloading via the communication network. Alternatively, the computer program executed by the supplementary information processing apparatus 18 of the embodiments may be configured to be provided or distributed via a communication network, such as the Internet. Alternatively, the computer program executed by the supplementary information processing apparatus 18 may be configured to be provided while being pre-installed in the ROM 203 or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing system comprising:
at least one supplementary information processing apparatus; and
a main information processing apparatus configured to be connected to each of the at least one supplementary information processing apparatus via a communication network,
the at least one supplementary information processing apparatus each comprises:
one or more hardware processors configured to function as:
an inputter configured to acquire input information;
a first arithmetic processor configured to execute, on the input information, arithmetic processing using a preceding network, the preceding network being a portion from an input layer to a boundary layer in a first neural network, the boundary layer being located at a predetermined position; and
a transmitter configured to transmit intermediate information to the main information processing apparatus, the intermediate information indicating an arithmetic result of the arithmetic processing using the preceding network, and
the main information processing apparatus comprising:
one or more hardware processors configured to function as:
a receiver configured to receive the intermediate information from each of the at least one supplementary information processing apparatus;
a second arithmetic processor configured to execute, on the intermediate information, arithmetic processing using a succeeding network, the succeeding network being a portion from a layer subsequent to the boundary layer to an output layer in the first neural network; and
an outputter configured to output output information indicating an arithmetic result of the arithmetic processing using the succeeding network.

2. The information processing system according to claim 1, wherein the intermediate information has less information amount than information amount of the input information.

3. The information processing system according to claim 1, wherein as the at least one supplementary information processing apparatus, a plurality of the supplementary information processing apparatuses is provided.

4. The information processing system according to claim 1, wherein
the at least one supplementary information processing apparatus further comprises:
a third arithmetic processor configured to execute, on the intermediate information, arithmetic processing using a neural network for determination; and
a determiner configured to determine whether the intermediate information is to be transmitted to the main information processing apparatus in accordance with an arithmetic result of the arithmetic processing using the neural network for determination, and
the transmitter is configured to, upon determination that the intermediate information is to be transmitted to the main information processing apparatus, transmit the intermediate information to the main information processing apparatus.

5. The information processing system according to claim 4, wherein processing amount of the arithmetic processing using the neural network for determination is less than processing amount of the arithmetic processing using the succeeding network.

6. The information processing system according to claim 4, wherein the transmitter is configured to transmit the intermediate information to the main information processing apparatus in accordance with a plurality of results of determination of whether the intermediate information is to be transmitted to the main information processing apparatus, the determination being made for a plurality of pieces of the input information generated at different times.

7. An information processing system comprising:
at least one supplementary information processing apparatus; and
a main information processing apparatus configured to be connected to each of the at least one supplementary information processing apparatus via a communication network,
the at least one supplementary information processing apparatus each comprising:
one or more hardware processors configured to function as:
an inputter configured to acquire input information;

a first arithmetic processor configured to execute, on the input information, arithmetic processing using a neural network for determination;

a determiner configured to determine whether the input information is to be transmitted to the main information processing apparatus in accordance with an arithmetic result of the arithmetic processing using the neural network for determination; and a transmitter configured to, upon determination that the input information is to be transmitted to the main information processing apparatus, transmit the input information to the main information processing apparatus, and the main information processing apparatus comprising:

one or more hardware processors configured to function as:

a receiver configured to receive the input information from each of the at least one supplementary information processing apparatus;

a second arithmetic processor configured to execute, on the input information, arithmetic processing using a first neural network; and an outputter configured to output output information indicating an arithmetic result of the arithmetic processing using the first neural network.

8. The information processing system according to claim 7, wherein processing amount of the arithmetic processing using the neural network for determination is less than processing amount of the arithmetic processing using the first neural network.

9. The information processing system according to claim 7, wherein as the at least one supplementary information processing apparatus, a plurality of the supplementary information processing apparatuses is provided.

10. The information processing system according to claim 7, wherein the transmitter is configured to transmit the input information to the main information processing apparatus in accordance with a plurality of results of determination of whether the input information is to be transmitted to the main information processing apparatus, the determination being made for a plurality of pieces of the input information generated at different times.

* * * * *